United States Patent [19]

Gnauck et al.

[11] Patent Number: 5,365,362
[45] Date of Patent: Nov. 15, 1994

[54] ULTRA-HIGH CAPACITY NON-SOLITON OPTICAL TRANSMISSION USING OPTICAL PHASE CONJUGATION

[75] Inventors: Alan H. Gnauck, Middletown; Christian Kurtzke, Hazlet, both of N.J.

[73] Assignee: AT&T Bell Laboratories, Murray Hill, N.J.

[21] Appl. No.: 120,014

[22] Filed: Sep. 10, 1993

[51] Int. Cl.⁵ ................... H04B 10/00; H04B 10/02
[52] U.S. Cl. .................................. 359/174; 359/160; 359/161; 359/173; 359/179; 359/341; 372/6; 385/122
[58] Field of Search ............ 359/111, 134, 153, 154, 359/160–161, 173–174, 176, 179, 183, 188, 195, 326–327, 334, 338, 341; 372/6, 21; 385/122, 11, 14, 43, 24

[56] References Cited

U.S. PATENT DOCUMENTS 5,117,303  5/1992  Desurvire et al. ............... 359/179
5,243,610  9/1993  Murata ............................ 372/21

FOREIGN PATENT DOCUMENTS 0531210  3/1993  European Pat. Off. ........... 319/173
2007430  4/1992  WIPO ............................ 319/188

OTHER PUBLICATIONS

Gnauck, A. H., Jopson, R. M. and Derosier, R. M., "10-Gb/s 360-km Transmission Over Dispersive Fiber Using Midsystem Spectral Inversion," IEEE Photonics Technology Letters, vol. 5, No. 6, Jun. 1993, pp. 663–666.

Hasegawa, Takasi, Inoue, Kyo, Oda, Kazuhiro and Hiromu, Toba, "Multi-Channel Frequency Conversion Over 1 THz Using Fiber Four-Wave Mixing," Post Deadline Digest of the Optical Amplifiers and their Applications Conference, Paper PD7, Jul. 4–6, 1993, Yokohama, Japan.

Kikuchi, Kazuro and Lorattanasane, Chaloemphon, "Compensation For Pulse Waveform Distortion In Ultra-Long Distance Optical Communication Systems By Using Nonlinear Optical Phase Conjugator," Optical Amplifiers and Their Applications, 1993 Technical Digest, Series vol. 14, Jul. 4–6, 1993, Yokohama, Japan, pp. 22–25.

Watanabe, Shigeki, Naito, Takao and Chikama, Terumi, "Compensation of Chromatic Dispersion in a Single-Mode Fiber by Optical Phase Conjugation," IEEE Photonics Technology Letters, vol. 5, No. 1, Jan. 1993, pp. 92–95.

Yariv, Annon, Fekete, Dan and Pepper, David M., "Compensation for Channel Dispersion by Nonlinear Optical Phase Conjugation," Optics Letters, vol. 4, 1979, pp. 52–54.

Primary Examiner—Richard E. Chilcot, Jr.
Assistant Examiner—Kinfe-Michael Negash

[57] ABSTRACT

The present invention provides an apparatus and method for achieving bit rate distance products on the order of 200 Tbits/s-km in non-soliton optical communication using optical phase conjugation. The apparatus and method utilize phase conjugation and adjustments of in-line amplifier number, spacing, and/or output power in order to compensate for the interaction between first order dispersion and fiber nonlinearity dispersion effects in an optical fiber span. The present invention provides additional techniques for adjusting system parameters, such as dispersion-length products of first and second portions of the fiber span, in order to compensate for changes in first order dispersion resulting from non-zero second order dispersion. The method and apparatus also provide an improved multi-channel optical phase conjugation system design.

20 Claims, 5 Drawing Sheets

ULTRA-HIGH CAPACITY NON-SOLITON OPTICAL TRANSMISSION USING OPTICAL PHASE CONJUGATION

BACKGROUND OF THE INVENTION

1. Field of the Invention

The present invention relates generally to improvements in optical communication systems. More particularly, the present invention relates to optical communication systems using optical phase conjugation to compensate for fiber dispersion.

2. Description of the Prior Art

Optical communication typically involves transmitting high bit rate digital data over silica glass fiber by modulating a laser or other optical source. Glass fibers have a very broad bandwidth, on the order of 40,000 THz, and can therefore in theory support total data rates on the order of 20,000 Tbits/sec. However, the practical fiber transmission capability is limited by system constraints, among the most important of which are the chromatic dispersion and nonlinearities of the optical fiber itself. Although optical fiber also attenuates the transmitted signal, at a rate of about 0.2 dB per km, the development of erbium-doped fiber amplifiers (EDFAs) has essentially eliminated fiber attenuation as an obstacle to achieving longer transmission distances.

Chromatic dispersion, often simply called dispersion, refers to a phenomenon in which the speed of an optical signal through the fiber varies as a function of the optical signal frequency or wavelength in standard single-mode fibers. For wavelengths below about 1.3 $\mu$m, longer wavelengths travel faster than shorter ones, and the resulting dispersion is commonly referred to as normal. Above 1.3 $\mu$m, shorter wavelengths travel faster than longer ones, and the dispersion is referred to as anomalous. Dispersion is typically expressed in units of picoseconds per kilometer-nanometer (ps/km-nm), indicating the number of picoseconds a pulse with a bandwidth of 1 nanometer will spread in time by propagating over 1 kilometer of fiber.

One important fiber nonlinearity which can limit transmission capability is the Kerr effect, in which the index of refraction increases with the intensity of the applied optical signal. Changes in the fiber index of refraction modulate the phase of a signal passing through the fiber, and thereby impose a frequency chirp which redistributes the signal frequency spectrum. This phenomenon is known as self-phase modulation in single channel systems in which the optical signal modulates itself. In multi-channel systems, in which one signal causes modulation of other signals, the phenomenon is referred to as either cross-phase modulation or four-photon mixing. Lower frequencies are shifted toward the leading edge of an optical signal pulse and higher frequencies are shifted toward the trailing edge. The resulting changes in frequency distribution are translated to amplitude modulation by the fiber dispersion.

Chromatic dispersion and the Kerr effect therefore both lead to increasing optical signal distortion as a function of transmission distance. For long distance communication over optical fiber, therefore, dispersion and nonlinearities must be controlled, compensated or suppressed. A dispersion and nonlinearity control technique, currently used in terrestrial and transoceanic optical fiber transmission, is electronic regeneration. Repeaters are spaced at appropriate locations along the transmission path to electronically detect, regenerate and retransmit the optical signal before the signal distortion becomes excessive. Electronic regeneration, however, limits the maximum achievable data rate to that of the electronic hardware, rather than that of the wider bandwidth optical fiber. In addition, repeaters are expensive to build and maintain, do not permit flexible system upgradability, and must be spaced at relatively short intervals along the fiber to effectively control optical signal distortion.

Repeaterless compensation techniques have also been developed. One such technique involves solitons, which are optical signal pulses having a well-defined amplitude, pulse width and peak power for a given anomalous dispersion value, such that self-phase modulation due to the Kerr nonlinearity and anomalous chromatic dispersion interact to stabilize the pulse shape. A soliton maintains its shape due to this interplay between dispersion and nonlinearity, and can therefore travel greater distances without regeneration. However, soliton systems also suffer from a number of significant drawbacks, including the need for mode-locked sources and a large number of distributed sliding frequency filters to overcome timing jitter at bit rate distance products on the order of about 100 Tbits/s-km, a need for a large number of distributed amplifiers due to high signal power requirements, a greater sensitivity to amplifier degradation or failure, and difficulty in tracing system failures to a particular portion of the span. These problems generally lead to higher costs for system implementation, maintenance and upgrade. However, soliton transmission provides the highest currently available optical transmission capacity. With sliding frequency filters, a bit rate-distance product of about 200 Tbit/s-km has been demonstrated. This bit rate-distance product will allow, for example, single channel 10,000 km transoceanic transmission at a data rate of 20 Gbit/s. High capacity non-soliton transmission typically requires either non-dispersive fiber or complicated dispersion management, and is limited to a bit rate distance product of about 90 Tbits/s-km.

Several of the problems associated with soliton transmission are alleviated by another known repeaterless dispersion compensation technique, midsystem optical phase conjugation. Because the phase conjugate of an optical pulse is in effect a time reversal of the pulse, an optical phase conjugator placed at the midpoint of a fiber optic transmission path allows the first order chromatic distortion of the first half of the path to be eliminated by the identical first order distortion produced as the conjugated signal propagates along the second half. See A. Yariv, D. Fekete and D. Pepper, "Compensation for channel dispersion by nonlinear optical phase conjugation", optics Letters, vol. 4, pp. 52–54, 1979; K. Kikuchi and C. Lorattanasane, "Compensation for Pulse Waveform Distortion in Ultra-Long Distance Optical Communication Systems by Using Nonlinear Optical Phase Conjugation," 1993 Technical Digest Series Volume 14, Conference Jul. 4–6, 1993, Yokohama, Japan. Midsystem optical phase conjugation has extended the bit rate distance product achievable in the anomalous dispersion region at 1.5 $\mu$m wavelength of the conventional single-mode fiber which makes up much of the world's existing fiber communication channels. See A. Gnauck, R. Jopson and R. Derosier, "10 Gb/s 360 km Transmission over Dispersive Fiber Using Midsystem Spectral Inversion", IEEE Photonics Technology Letters, vol. 5, no. 6, June 1993. However, previously demonstrated phase conjugation techniques can achieve a maximum bit rate distance product of only about 3.6 Tbit/s-km, considerably less than that achievable with either soliton systems or non-soliton systems with dispersion management. Thus, the many advantages of optical phase conjugation over soliton or dispersion managed transmission may not presently be obtained for optical communication capacities greater than about 3.6 Tbit/s-km.

Demonstrated optical phase conjugation compensation techniques generally ignore the effects of second order chromatic distortion and nonlinearities in the optical fiber. First order chromatic dispersion is typically approximated as a constant function of wavelength and second order dispersion, its derivative, is therefore taken to be zero. However, in practical systems, second order dispersion is typically on the order of 0.05 to 0.09 ps/km-nm$^2$. In a linear system, distortions resulting from second order dispersion cannot presently be compensated by optical phase conjugation. The presence of higher order dispersion thus acts as a limit on achievable transmission distance using optical phase conjugation.

As is apparent from the above, a need exists for an improved non-soliton optical communication system which extends the achievable bit rate distance products for non-soliton systems. The improved system should compensate for linear second order chromatic dispersion, for the interplay between first order dispersion and fiber nonlinearities and also for the interplay between second order dispersion and nonlinearities. Furthermore, the improved system should provide bit rate distance products comparable to those presently achievable only with solitons, while avoiding the cost and complexity of soliton transmission.

SUMMARY OF THE INVENTION

The present invention provides a non-soliton optical communication system having a bit rate-distance product on the order of 200 Tbit/s-km for single channel transmission. The present invention includes a method of optical signal transmission which includes the steps of providing an optical fiber span made up of at least one segment, each segment divided into first and second portions; providing an optical signal transmitter at one end of the optical fiber span for supplying an optical signal to the fiber span; providing an optical signal receiver at the opposite end of the fiber span for receiving the optical signal from the fiber span; providing one or more in-line amplifiers within each of the portions of each segment; phase conjugating the optical signal in an optical phase conjugator located between the first and second portions of each segment to compensate for dispersion and nonlinearities within the fiber span; and adjusting a power level of the optical signal in at least one of the portions of a segment such that nonlinearities within the span are compensated. The method of the present invention obtains improvement over optical phase conjugation in accordance with the prior art in part by compensating for the interaction between first order dispersion and fiber nonlinearities.

In accordance with one aspect of the present invention, the interplay between the first order dispersion and fiber nonlinearities on the first portion of a fiber span may be undone in the second portion by adjusting the optical signal power level within the first and/or second portions. The adjustment may be made by varying one or more system parameters, including amplifier number, spacing and output power within a given portion of the span.

In accordance with another aspect of the present invention, the method may include the additional step of increasing the length of the second portion of at least one of the segments by an amount sufficient to compensate for second order dispersion within the fiber span. Improvements are thereby obtained over current techniques which ignore the effects of second order chromatic dispersion.

In accordance with another aspect of the present invention, the step of increasing the length of the second portion of at least one segment may be accomplished by adding a single additional length of fiber to the second portion after the final in-line amplifier within the second portion of that segment, or by adding substantially equivalent additional lengths of fiber between each of the in-line amplifiers within the second portion of the segment. The amount of the increase is determined by an equation based upon the derivative of chromatic dispersion as a function of wavelength.

In accordance with yet another aspect of the present invention, the optical signal may be a multi-channel optical signal and the phase conjugator may be a multi-channel phase conjugator. The individual channel signals making up the multi-channel optical signal may be individually phase conjugated by passing the multi-channel signal through a channel router, passing each of the individual channel signals through a single channel phase conjugator, and recombining phase conjugated versions of the channel signals. Phase conjugation of the optical channel signals may be designed to minimize second order dispersive effects in such a multi-channel optical phase conjugation system. One such technique involves frequency shifting each channel signal by an equivalent frequency amount such that each channel signal experiences the same second order dispersion effect. This may accomplished by, for example, frequency shifting each channel such that it occupies the frequency position of its adjacent channel prior to phase conjugation.

As a feature of the present invention, an improved non-soliton optical communication system is provided which can achieve substantially higher bit rate distance products than existing non-soliton systems.

As another feature of the present invention, the improved system compensates for the interplay between first order dispersion and fiber nonlinearities by using a variety of techniques. One such technique is adjusting the number, spacing, and/or the output power levels of the in-line amplifiers. An alternative technique involves adjusting the types of fiber used in different portions of the span such that each of the portions have the same first order dispersion and nonlinearity interaction. Improvements are thereby obtained over existing techniques which generally use optical phase conjugation to compensate for linear first order dispersive effects only.

As another feature of the present invention, the improved system compensates for changes in first order dispersion resulting from non-zero second order dispersion. A simple computation may be made to determine the amount of additional length required in the second portion of a given segment to substantially compensate for the effects of second order dispersion and thereby extend transmission distance for a given bit rate.

As yet another feature of the present invention, an optical communication system is provided which is capable of achieving non-soliton transmission across 10,000 km at a single channel bit rate of 20 Gbit/s. The system can achieve this performance using a single optical phase conjugator located between a first and second portion of a single segment optical fiber span. Ultra-high capacity transoceanic transmission in an optical phase conjugation system is now made possible.

As a further feature of the present invention, the improved system provides bit rate-distance products comparable to those presently achievable only with solitons, while avoiding the cost and complexity of soliton transmission. Optical phase conjugation systems are in principle simpler to implement, easier to maintain, troubleshoot and upgrade, and require lower optical signal power levels and therefore fewer distributed amplifiers. These advantages are provided by the present invention, but at significantly higher bit rate-distance products than previously possible.

The above discussed features, as well as additional features and advantages of the present invention, will become apparent by reference to the following detailed description and accompanying drawings.

DETAILED DESCRIPTION

The present invention extends the achievable bit rate-distance product of a non-soliton optical phase conjugation system by adjusting various system parameters, including the number, spacing and/or output power of the in-line amplifiers, and the length-dispersion products of portions of the span. The adjustments compensate for the interaction between first order dispersion and fiber nonlinearities, as well as for the effects of second order dispersion. Although the following detailed description illustrates the utility of the present invention primarily in terms of a fiber span incorporating a single phase conjugator, it should be understood that this is by way of example and not limitation. The present invention may also be used on a multiple segment fiber span incorporating optical phase conjugators within each segment. Furthermore, although the present invention is particularly well-suited to long-haul fiber spans, it may also be used to improve optical phase conjugation on shorter spans.

Figure 1A:
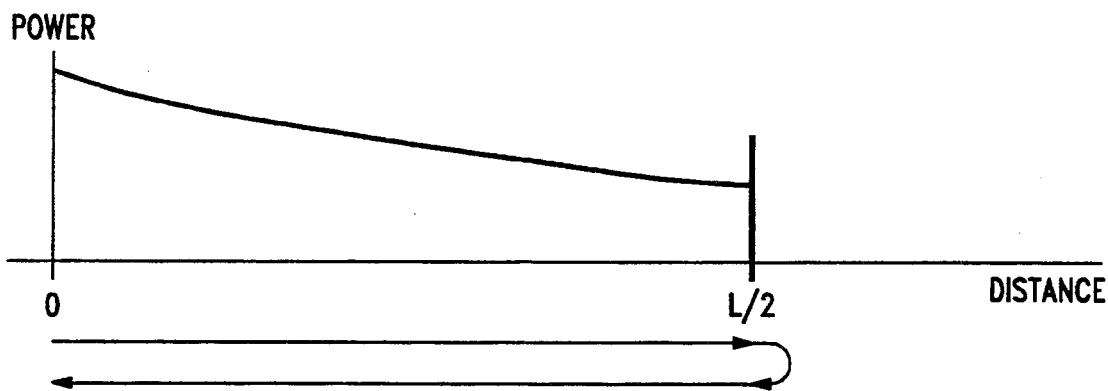
FIG. 1(a) is a qualitative plot of optical signal power distribution along an optical fiber span of length L/2 as a function of distance.
Figure 1B:
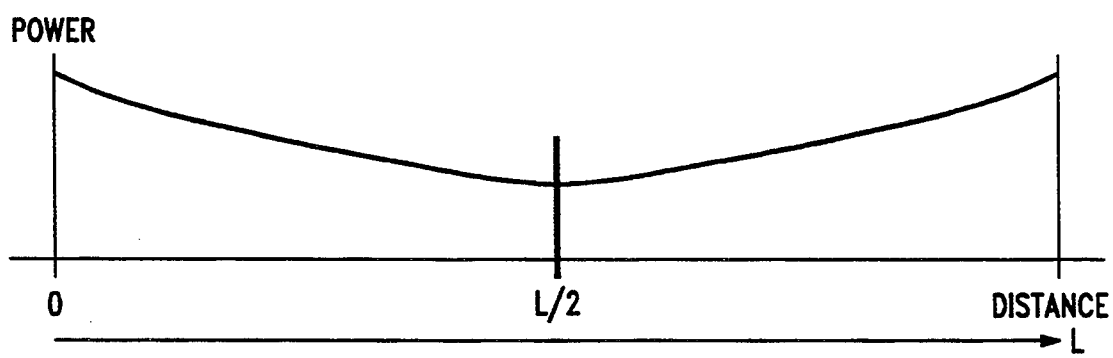
FIG. 1(b) is a qualitative plot of optical signal power distribution along an optical fiber span of length L showing the distributed amplification necessary for phase conjugation to cancel fiber chromatic dispersion.

The dispersion compensation effects of midsystem optical phase conjugation are illustrated qualitatively in FIG. 1. A typical power distribution as a function of distance along an optical fiber of length L/2 is shown in FIG. 1(a). Due to the time reversal of phase, phase conjugating a distorted signal at position L/2 and propagating it back down the optical fiber as indicated by the arrows will cause dispersion effects to cancel out. As a result, an undistorted input signal is reproduced at position 0. Instead of utilizing backward propagation, the same effect can be produced using a virtual reversal of propagation direction by inverting the power distribution along the second half of the fiber span of length L with respect to the system midpoint L/2, as shown in FIG. 1(b). The power distribution along each half of the span is symmetric about the system midpoint, and thus the conditions required for dispersion cancellation by phase conjugation are satisfied. The symmetric power distribution shown may be produced in a repeaterless system by double-sided distributed amplification.

Figure 1C:
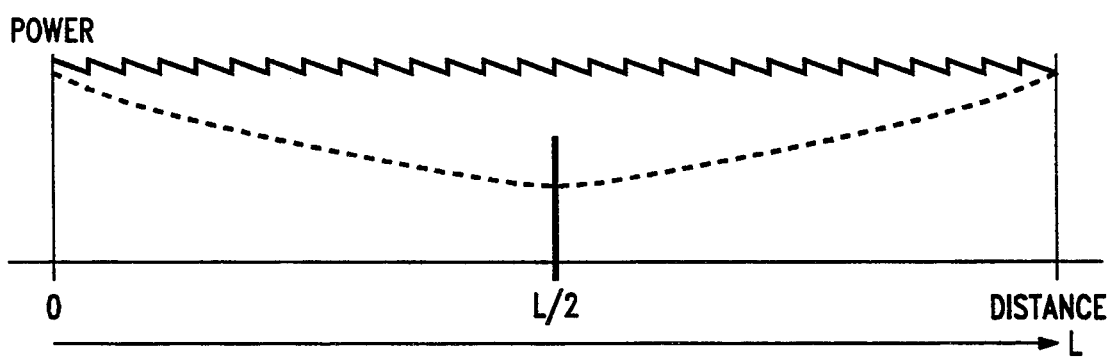
FIG. 1(c) is a qualitative plot of optical signal power distribution along an optical fiber span of length L incorporating in-line fiber amplifiers to approximate a lossless power distribution.

Another approach is to incorporate a an appropriate quantity of erbium-doped fiber amplifiers (EDFAs) such that the power distribution along the fiber optic span is as shown in FIG. 1(c). The fiber amplifiers are spaced such that the fiber span power distribution approximates that of a lossless line. Since the distribution is approximately lossless, a substantial duplicate of the input signal is obtained at position L after phase conjugation at L/2, without an inversion of the power distribution about the system midpoint. The remaining description will assume that the latter approach, spacing EDFA amplifiers so as to approximate a lossless distribution, is used. It should be recognized, however, that the present invention may be practiced without such an approximate distribution as long as a symmetric distribution is provided.

Figure 2:
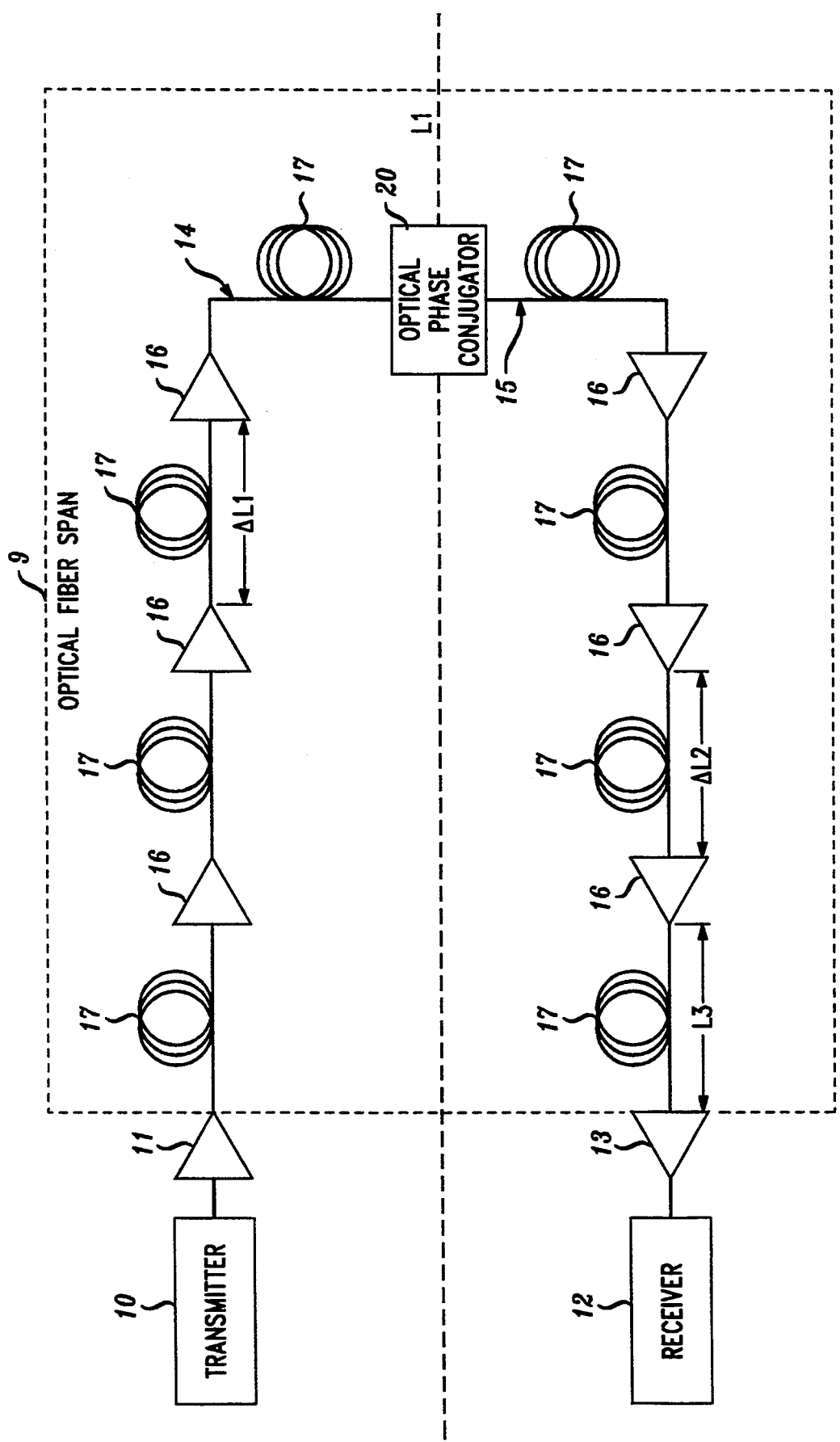
FIG. 2 is a block diagram of a non-soliton optical communication system in which the amplifier spacing on the second portion of the span has been adjusted, in accordance with the present invention, to compensate fiber second order chromatic dispersion and nonlinearities.

FIG. 2 shows an exemplary optical communication system incorporating optical phase conjugation for dispersion compensation. The optical communication system shown includes an optical fiber span 9 and an optical signal transmitter 10 at one end of the fiber span. A booster amplifier 11 follows the transmitter 10 to amplify the optical signal output of the transmitter 10 to a power level of sufficient to satisfy system performance specifications. The booster amplifier 11 is not considered part of the optical fiber span and may be contained within transmitter 10. An optical signal receiver 12 is located at the opposite end of the optical fiber span 9. The optical fiber span 9 thus provides a communication path between the transmitter 10 and the receiver 12. A preamplifier 13 amplifies the optical signal before it arrives at the receiver 12. The preamplifier 13 is not considered part of the optical fiber span 9 and may be contained within receiver 12. The exemplary optical fiber span 9 of FIG. 2 may be considered to comprise a single segment having a first portion 14 of length L1 and a second portion 15 of length L2. The fiber span 9 is of length L, where L=L1+L2. Each single segment span 14 and 15 includes a number of in-line erbium-doped fiber amplifiers (EDFAs) 16 connected by a number of individual fiber loops 17. The fiber loops 17 represent lengths of fiber within the fiber span 9. The EDFAs 16 compensate for the attenuation of the optical fiber and are spaced in a manner to approximate a lossless power distribution, as discussed above. A single optical phase conjugator 20 is located between first portion 14 and second portion 15 of the fiber span.

The segment terminology used above in describing the optical fiber span is related to the number of optical phase conjugators within the span. In the embodiment shown in FIG. 2, the span includes only a single optical phase conjugator placed between a first and second portion of the span. Thus, in the single phase conjugator case, the span and segment are one and the same. However, in other cases, to be discussed in greater detail below, it may be desirable to divide the span into several segments, each of which includes a phase conjugator between a first and a second portion of its respective segment.

In the prior art systems, the phase conjugator 20 is typically placed at the system midpoint, or as shown in FIG. 1, the point L/2 for a fiber span of length L. This arrangement in the prior art systems is used to compensate for the effects of first order linear dispersion. In these linear systems, the power distribution is in principle arbitrary and equi-distant amplifier spacing is often used for convenience. The known midspan placement generally does not compensate for second order dispersion nor for the interaction between first order dispersion and fiber nonlinearities.

The interaction between first order dispersion and fiber nonlinearities may be compensated by adjusting the power level of an optical signal at various points in the fiber span. The adjustment in optical signal power may be made by changing the number of in-line amplifiers, the relative positions or spacing between the amplifiers, and/or the output power of one or more of the amplifiers. By performing power adjustments in this manner, the interplay or interaction between the first order dispersion and fiber nonlinearity on a first position of the span or segment of the span may be undone by, for example, providing the same interaction in the second portion. The same interaction may be provided by the power level adjustments described above. Alternatively, the fiber characteristics on the first and second portion may be adjusted such that effects of the interaction are undone after phase conjugation.

In known optical phase conjugation techniques, in which second order dispersion is not taken into account and usually considered to be zero, the number, position and output power of the in-line amplifiers is in principle arbitrary, and generally the same on both portions of a span on either side of a phase conjugator. In practical systems, however, in which second order dispersion is non-zero, the length of a portion of the span may be adjusted in accordance with the present invention, which results in a change in the power distribution on that portion. Therefore, in order to achieve the same scaled nonlinearity effects on both spans the present invention adjusts the in-line amplifier number, spacing and/or output power as will be described below. It should be understood that the term "adjusting" as used herein may be taken to refer to actual physical variation of system parameters, or determination of appropriate system parameters by solution of well-known equations governing signal propagation in optical fiber, as well as other adjustment techniques.

The appropriate amplifier number, spacing and power may be determined in accordance with the following equation for nonlinear bit rate distance product.

$$B \cdot L = \xi_n \cdot \sqrt{\frac{G \ln(G)}{(G-1)\gamma \cdot P_{ave} \cdot \beta_2}}$$

In this equation, G is the amplifier gain, equivalent to $\exp(\alpha \Delta L)$, where $\alpha$ is the fiber attenuation and $\Delta L$ is the amplifier spacing; B is the system bit rate; L is the length of a fiber span or a portion thereof; the quantity $\gamma$ is the nonlinear coefficient, which is a function of fiber parameters; $P_{ave}$ is the average power supplied to the span from a transmitter or amplifier; $\beta_2$ is the first order dispersion; and $\xi_n$ is a constant characterizing the particular modulation/demodulation scheme used.

In order to equalize nonlinearity in span portions on either side of a phase conjugator, the bit rate distance product BL for each portion may be solved for B. If $B_1$ is the bit rate for a first portion of a span and $B_2$ the bit rate for a second portion, the nonlinearity in each portion will be equivalent if $B_1 = B_2$. Since the length of the two portions $L_1$, $L_2$ will typically be different in accordance with the present invention, either the power level $\gamma P_{ave}$, or the amplifier spacing $\Delta L$ on the first or second portion of the span, should be adjusted to achieve the desired condition of $B_1 = B_2$. Using the above equation, optimal values for $P_{ave}$ may be calculated for a given amplifier spacing and given lengths of first and second portions of the span. The actual amplifier output power along the span would then be adjusted to achieve this power distribution. Alternatively, both spacing and average power could be varied to determine a variety of configurations which would satisfy the $B_1 = B_2$ condition. The number of in-line amplifiers used could also be varied to achieve a similar effect.

As previously mentioned, the placement of the optical phase conjugator in accordance with the present invention may not be at the precise system midpoint. An alternative placement may be chosen in order to compensate for the effects of second order dispersion. The second order dispersion may be compensated by, for example, adjusting a length-dispersion product of first and second portions of the span or segment of the span in a manner to be discussed more fully below. As mentioned above, the first portion 14 of the single segment span shown has a length L1, while the second portion 15 of the span has a length L2. The present invention provides for improved optical communication using optical phase conjugation in part by this compensation for the effects of non-zero second order dispersion.

Figure 3:
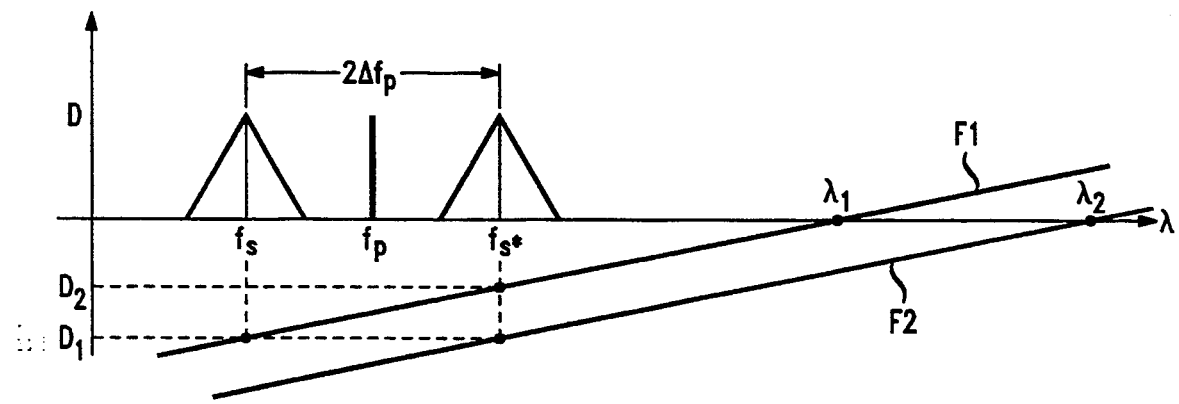
FIG. 3 is a qualitative plot of fiber dispersion as a function of wavelength.

An exemplary plot of fiber dispersion D as a function of wavelength $\lambda$ is shown in FIG. 3. In the plot, the dispersion D is plotted on the vertical axis as a function of the wavelength $\lambda$ on the horizontal axis. First order dispersion, also referred to as $B_2$, is represented as an exemplary linear function F1. Second order dispersion, also referred to as $B_3$, is represented by the slope of the exemplary function F1 in FIG. 3 and is constant for a linear function F1. In order to have optimal dispersion compensation using phase conjugation, the dispersion-length product of the first and the second portion of the span or segment should be equivalent. In other words, the dispersion-length product D1L1 should be substantially equivalent to the dispersion-length D2L2. Second order dispersion gives rise to unequal dispersion-length products in systems incorporating midsystem phase conjugation, as a result of the frequency shift of the phase conjugated signal coupled with the slope of the first order dispersion curve as a function of frequency.

An exemplary frequency spectrum is also shown along the horizontal axis in FIG. 3. In optical phase conjugation, to be discussed in greater detail below, an optical signal of frequency fs is four-photon mixed with a pump signal of frequency fp to produce a phase conjugate of frequency fs*. The optical input signal of frequency fs has a first order dispersion value of D1 for fiber having the dispersion function F1. The phase conjugate fs*, however, has a first order dispersion value of D2 in the same fiber, since its frequency has been shifted by an amount fs*-fs. The difference in dispersion D2-D1 between the original optical input signal of frequency fs and its conjugate of fs* will, in the considered case, result in less than total cancellation of dispersion as the phase conjugate propagates down the second portion of the fiber. The difference is due to the slope of the dispersion function, and the effect of this slope is not compensated for in existing systems. Instead, as previously mentioned, existing system designs assume the second order dispersion is zero, and therefore that the equivalent dispersion-length product condition L1D1=L2D2 required for perfect dispersion cancellation is met for L1=L2.

The method of the present invention compensates for the slope of the fiber dispersion curve, or second order dispersion, by determining the optimal placement of the optical phase conjugator within a fiber span. An equation relating the length L2 of the second portion of a single segment span is:

$$L2 = \frac{L1}{(1 - 2\Delta f p(dD/d\lambda))}$$

In the above equation, $\Delta fp$ represents the frequency spacing between the optical signal and the pump signal, and $dD/d\lambda$ is the second order dispersion. The above equation relates L2 to L1 as a function of second order dispersion. This equation may be used to calculate a value for L2 given a length L1, or vice versa. As previously indicated, the optical phase conjugator is placed between the first and second portions, having length L1 and L2 respectively, of the single segment span. The determination of the lengths L1 and L2 establishes the desired placement of the optical phase conjugator for compensating second order dispersion in accordance with the present invention. In a system incorporating a single phase conjugator, performance may be improved either by increasing the length of the second portion of the span, or decreasing the length of the first portion of the span, for phase conjugation as depicted in FIG. 3.

An alternative to increasing or decreasing the length of the second portion of the span is to use fiber with a different dispersion function in the second portion of the span. Referring again to FIG. 3, fiber with a dispersion function F2 may be used in the second span to compensate for the slope of the dispersion function F1 in the first portion of the span. Since the phase conjugation process produces a signal component at frequency fs*, the fiber in the second span could be chosen such that D1 at fs is the same as D2 at fs*, or F1(fs)=F2(fs*). Since the two dispersion values D1 and D2 are equivalent, equal lengths L1 and L2 would satisfy the condition L1D1=L2D2 desired for optimal dispersion compensation using phase conjugation. The fiber dispersion function of the first portion could be adjusted in a similar manner to produce a dispersion value D1 that will be compensated by the dispersion D2 in the second portion. Thus, as in the case of length changes, either the dispersion function of the first or the second portion may be altered to compensate for the difference in first order dispersion D1-D2 resulting from non-zero second order dispersion.

Another alternative to increasing or decreasing the length of the second portion of the span is to use fiber in the second portion which has an equal but opposite second order dispersion value to that in the fiber of the first portion. The phase conjugation reverses the phase of an optical signal with respect to time but does not reverse the effects of second order dispersion. Second order dispersion is therefore not undone as the conjugate of the optical signal propagates along the second portion of the span or segment of the span. However, by reversing the sign of the second order dispersion in the fiber making up the second portion, the second order dispersion effects on each portion can be made to cancel each other out. If the length of the first and second portions are unequal, an appropriate adjustment to the value as well as the sign of the second order dispersion could be made to ensure cancellation. One technique for achieving this sign change in second order dispersion is by designing a multi-cladding fiber, in which a different core area may lead to a difference in $\gamma$. The difference in $\gamma$ can then be adjusted, for example, by varying $P_{ave}$, amplifier number and/or amplifier spacing.

The above techniques may be extended to systems utilizing more than one phase conjugator. In such a system, a fiber span of length L is divided into a number of segments, each of the segments having a first and a second portion. An optical phase conjugator is placed between the first and second portions of each segment, in order to cancel the dispersion effects within that segment. Dispersion effects resulting from propagation along the first portion of each segment are eliminated during propagation along the properly matched lengths of the second portions. Dispersion compensated reproductions of the transmitter output signal occur at the endpoints of the second portion of each segment. For a fiber span of length L, divided into n segments, each of approximately L/n length, n optical phase conjugators are required. The length of the first and second portion of each of the segments, and thereby the placement of the optical phase conjugator within each segment, will be determined in the same manner as in the single segment case described above. Using additional phase conjugators in effect breaks the fiber span into separately compensated segments of shorter length, and therefore may improve dispersion cancellation, since the amount of compensation necessary in each segment is reduced. It should be noted that the segments need not be of equal or approximately equal length. For example, a fiber span of length L could be divided into two segments, one of length ⅓ L and the other of length ⅔ L. Dispersion cancellation within each segment could then be accomplished by placing a phase conjugator between a first and second portion of each segment with the relative lengths of each portion determined in accordance with the invention.

The length of a first or a second portion of a given segment may be adjusted in a number of ways, including either distributing any additional length increase or decrease across the loops 17 between the in-line amplifiers 16, or adding or deleting a single piece of length after the final in-line amplifier in the second portion. Other length adjusting techniques could also be used. In distributing the additional length across the second portion of a segment, substantially equivalent lengths of fiber are added between the in-line amplifiers such that the amplifier spacing is increased by the amount of additional length L2-L1 divided by one less than the number of in-line amplifiers in that portion. A substantially equivalent distribution across in-line amplifiers is desirable in order to maintain an approximately lossless distribution across the fiber span or segment.

It may be necessary, when adjusting the length of the first or second portion of a span or segment as described above, to adjust in-line amplifier output power as well. In order to perform optimal dispersion compensation using phase conjugation, the same average power should be maintained throughout the first and second portions of a given segment. The rationale for equivalent power distribution was discussed above in conjunction with FIG. 1. When the length of a first or second segment portion is increased or decreased to compensate for second order dispersion, the average power along that portion will also change. A significant change in output power will prevent optimal dispersion cancellation. An adjustment to amplifier output power can maintain the desired equivalence between average power on the first and second portions. For example, the output power of the amplifiers in a lengthened second portion of a given segment may be increased to compensate for the change in average power resulting from the increased length. The power adjustment will differ depending upon whether the length increase is distributed across the second portion of the segment or added as a single additional length following the final in-line amplifier. In the case of a distributed length, a small adjustment to the output power of each in-line amplifier may be necessary. For a single additional length, an adjustment to the output power of the final in-line amplifier in the portion could be made.

The process of phase conjugation will now be described in greater detail. Phase conjugation of optical signals is typically performed using four-photon mixing, also known as four-wave mixing. Four-photon mixing is a nonlinear process which generates mixing products by mixing an input optical communication signal with one or more higher power optical signals, or pumps, in a nonlinear mixing medium. The nonlinear mixing medium may comprise a semiconductor laser amplifier, a semiconductor laser amplifier or a length of dispersion-shifted fiber. The efficiency of the four-photon mixing process depends upon the relative polarizations of the optical signal and the pump. Although optical signal polarization usually varies randomly with time, one can maintain optimal efficiency in the four-photon mixing process by, for example, detecting the input signal polarization and adjusting the pump. However, this detection and adjustment hardware complicates the phase conjugator, and may depolarize the optical signal such that each component of the signal has its own polarization, and the optical signal itself has no macroscopic polarization. Other techniques for controlling and/or adjusting the relative polarization of the optical signal and the pump are well known in the art and will not be further discussed herein. Failure to maintain proper polarization alignment between the signal and the pump will generally result in a decrease in signal power at the output mixing product frequency. In the case of four-photon mixing to obtain a phase conjugate, the advantages of optical phase conjugation could be offset by such a reduction in conjugated signal power.

Figure 4:
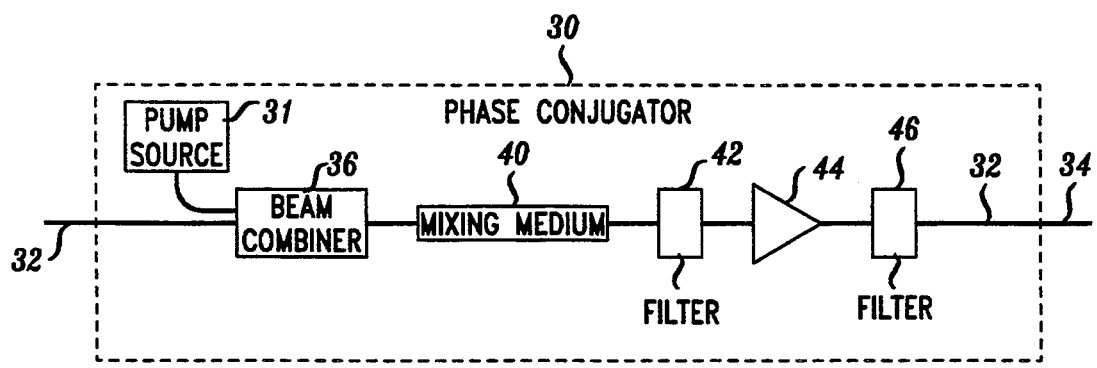
FIG. 4 is an exemplary prior art single channel optical phase conjugator suitable for use with the present invention.

An exemplary prior art optical phase conjugator is shown in FIG. 4. The phase conjugator 30 has a pump source 31, an optical signal input 32, and a phase conjugated optical signal output 34. The pump source 31 produces a pump signal, often simply referred to as a pump, which is combined with an input optical signal on line 32 in beam combiner 36. The combined signal drives a semiconductor laser amplifier 40 which serves as a nonlinear mixing medium. A first filter 42 separates the desired mixing product, the phase conjugate of the input signal, from the original signal, the pump and any undesired mixing products. The desired mixing product is then amplified in an optical amplifier 44 and finally filtered again in a second filter 46 to remove the amplified spontaneous emission (ASE) noise from the desired signal output on line 34. The phase conjugate of the input optical signal is available on line 34. It should be understood that the use of this exemplary phase conjugator requires polarization control as previously discussed in order to maintain the desired equivalent polarity between optical signal and pump.

The four-photon mixing process itself may be either non-degenerate or degenerate. In non-degenerate four-photon mixing, two distinct pumps mix with the incoming optical signal to produce the fourth signal. For an optical signal of frequency fs, a first pump of frequency fp1, and a second pump of frequency fp2, the non-degenerate mixing process produces a phase conjugate of the optical signal at a frequency $fp1+fp2-fs^*$ as well as at other frequencies including $2fs-fp1$ and $2fs-fp2$. In degenerate four-photon mixing, two of the mixing signals are supplied by a single pump. Thus, for an optical signal of frequency fs and a pump at frequency fp, degenerate four-photon mixing produces phase conjugates of the optical signal at $f1=2fp-fs$ and $f2=2fs-fp$. Either of the components f1 and f2 may be used as phase conjugates of fs in order to cancel the dispersive effects in a given length of fiber.

Figure 5:
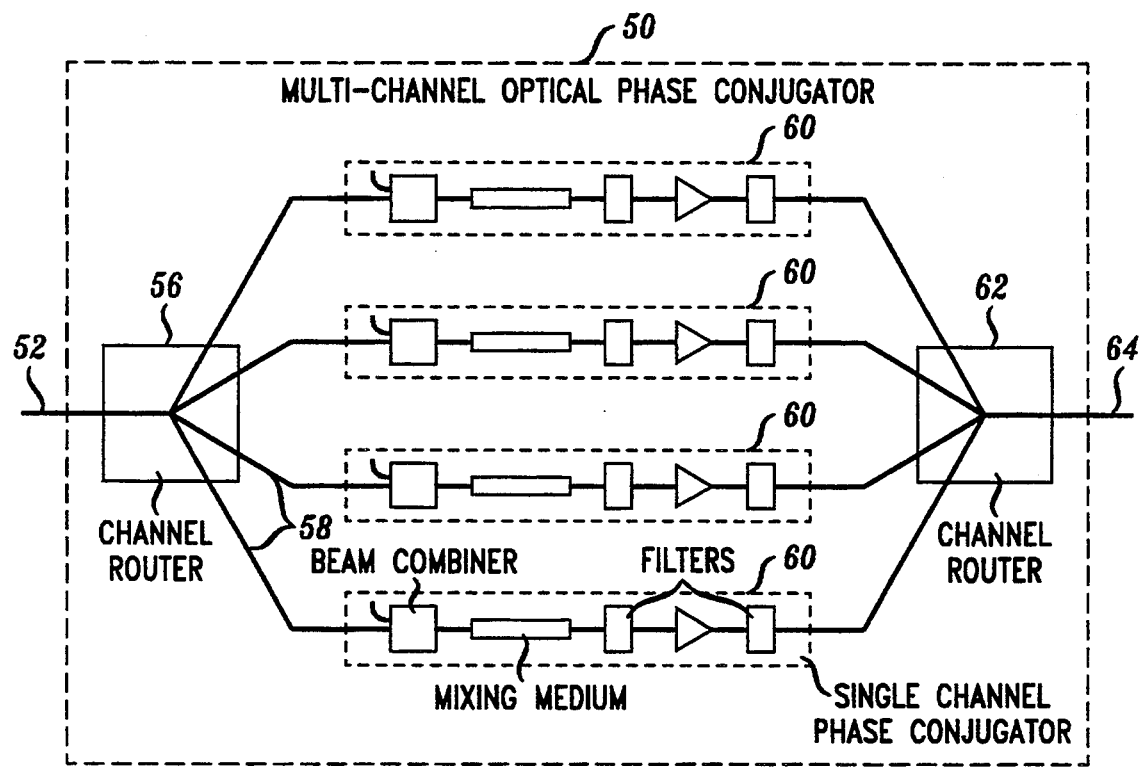
FIG. 5 is an exemplary multi-channel optical phase conjugator suitable for use with the present invention.

The present invention may be applied to multi-channel optical signals by replacing the above described optical phase conjugator with a multi-channel optical phase conjugator. To perform optical phase conjugation on a multi-channel system, the phase conjugate of the multi-channel signal must be obtained. An exemplary multi-channel optical phase conjugator is shown in FIG. 5. The multi-channel optical phase conjugator 50 includes a first channel router 56 which receives a multi-channel optical signal on line 52 and separates it into its channel signals according to channel wavelength or carrier frequency. The multi-channel signal typically consists of a number of discrete channel signals at different frequencies, each of which serves as a carrier for digital data. The multi-channel optical phase conjugator also includes a plurality of single channel phase conjugators 60, each of which phase conjugates one of the channel signals via four-photon mixing as described in the above discussion of FIG. 4. After the mixing produces the desired phase conjugated output for a given input channel signal, the individual phase conjugated channel signals are recombined in a second channel router 62 such that the desired phase conjugate of the entire multi-channel signal is obtained on line output 64.

In applying the present invention to multi-channel optical signals, the frequency shift of each channel signal resulting from optical phase conjugation should be such that optimal compensation of second order dispersion effects is possible for each channel signal. One technique is to perform the phase conjugation process in such a way as to ensure that each phase conjugated channel signal experiences the same minimum amount of dispersion. This may be accomplished by phase conjugating each channel signal such that its frequency after phase conjugation is that of its adjacent channel before phase conjugation. Since the frequency shift is minimized, it can be seen by reference to the exemplary dispersion function of FIG. 3 that the second order dispersion effect will also be minimized. Furthermore, if the channel signals are spaced equally apart in frequency, the resulting second order dispersion will be the same for each of the channel signals, and therefore all of the second order dispersion effects on the signals of the individual channels may be canceled by, for example, an increase in L2 for the second portion of the span, as described above. Since it may be desirable to perform a global conversion of channel signal frequencies to offset the effects of stimulated Raman scattering (SRS), the adjacent channel frequency shift could be performed for subsets of the channel frequencies rather than all of the channel frequencies, in order to obtain some compensation for SRS while still minimizing second order dispersion on each channel signal.

Figure 6:
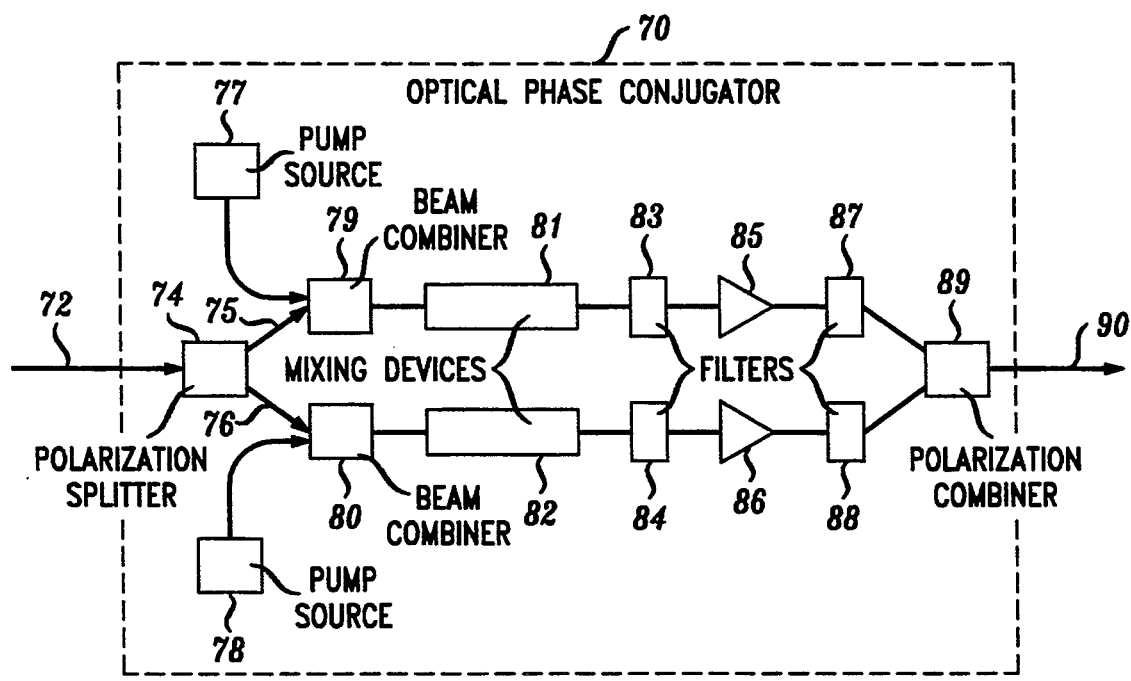
FIG. 6 is an exemplary polarization insensitive optical phase conjugator suitable for use with the present invention.

The need to control the optical signal and pump polarity during phase conjugation may be avoided by using a polarization insensitive optical phase conjugator. FIG. 6 shows an exemplary embodiment of a polarization insensitive optical four-photon mixer suitable for use with the present invention. Further detail regarding this embodiment may be found in U.S. patent application Ser. No. 08/120,013, entitled "Polarization-Insensitive Optical Four-Photon Mixer" filed on Sep. 10, 1993 and assigned to the present assignees. In the embodiment of FIG. 6, the optical phase conjugator 70 includes an optical signal input 72 and a polarization splitter 74. A single channel optical communication signal is applied to an optical signal input 72. The optical signal may be characterized as having both a TE and a TM polarization. For purposes of clarity, the TE polarization will be referred to herein as parallel and the TM as perpendicular. Polarization splitter 74 divides a single channel optical signal into parallel and perpendicular polarization components. The parallel polarization component of the input optical signal is supplied via polarization splitter 74 to a first mixing path 75, while the perpendicular polarization component is supplied to a second mixing path 76. Mixing paths 75, 76 have pump sources 77, 78 respectively. The mutually orthogonal pump signals produced in the first and second mixing paths 75, 76 are combined with their respective communication signal polarization components in beam combiners 79, 80 within paths 75, 76, respectively. The first and second beam combiners 79, 80 each couple a polarized pump and signal component together onto a single line which is fed into the first and second nonlinear mixing devices 81, 82 which may be semiconductor laser amplifiers. Within the first and second mixing devices 81, 82, the parallel and perpendicular signal components, respectively, are four-photon mixed with their respective substantially equivalently polarized pump signals.

In each of the paths 75, 76, a first filter 83, 84 receives a signal from mixing device 81, 82 which includes the pump, optical signal, and mixing product frequencies. The mixing product $2f_p - f_s$ is usually used as a phase conjugate product of degenerated mixing. The other signal frequencies are therefore eliminated by filtering in first filters 83, 84. The first filter 83, 84 in each path 75, 76 is then followed by an erbium-doped fiber amplifier 85, 86 which amplifies the phase conjugate. The output of amplifiers 85, 86 is then preferably filtered by a second filter 87, 88 in order to limit ASE noise resulting from the amplification, as well as to further eliminate the input signal, pump and undesired mixing products. A polarization combiner 89 combines the orthogonally polarized parallel and perpendicular mixing products. The output of the combiner 89 on output line 90 is the desired phase conjugated version of the input optical signal. Use of this polarization insensitive embodiment avoids the need for polarization control based upon the time-varying input signal polarization. This polarization insensitive phase conjugator may be used in the multichannel phase conjugator of FIG. 5 by replacing each of the single channel phase conjugators 60 with the polarization insensitive phase conjugator 70 of FIG. 6.

Other optical mixers may also be used as phase conjugators in the present invention. Another polarization insensitive four-photon mixer is disclosed in U.S. patent application Ser. No. 08/120,118, entitled "Polarization-Insensitive Optical Four-photon Mixer With Orthogonally-Polarized Pump Signals", filed on Sep. 10, 1993 and assigned to the present assignees. A dispersion-shifted fiber four-wave mixer suitable for use as a phase conjugator in the present invention is disclosed in T. Hasegawa et al., "Multi-Channel Frequency Conversion Over 1 THz Using Fiber Four-Wave Mixing", Post Deadline Digest of the Optical Amplifiers and their Applications Conference, paper PD-7, Jul. 4–6, 1993, Yokohama, Japan.

Figure 7:
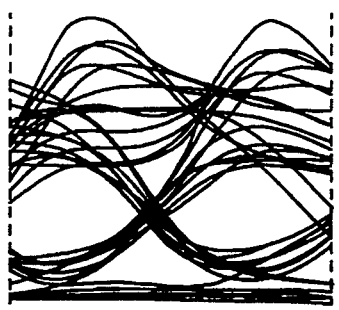
FIG. 7 shows computer simulation data obtained applying the techniques of the present invention to 100 Gbit/s optical communication over a 1,062 km span.

FIG. 7 illustrates simulation data obtained applying the techniques of the present invention to 100 Gbit/s single channel optical communication over a 1,062 km span. A single optical phase conjugator was used, and thus the span included only a single segment. The amplifier spacing was determined in accordance with the present invention to be 25 km on the first. portion of the span and 28.1 km on the second portion, corresponding to a length L1 of 500 km and a length L2 of 562 km. The input peak power was 20 mW and the fiber first and second order dispersion were $-2$ ps/km-nm and 0.08 ps/km-nm$^2$, respectively. A single optical phase conjugation carried out at a length L1 of 500 km produced a signal at the end of the 1062 km fiber span having the eye diagram shown. The eye diagram provides a measure of system performance by showing the variations in received signal logic levels for a given bit position over all possible bits of a pseudorandom test data stream. A clear opening is observed, corresponding theoretically to a zero bit error rate.

Figures 8A, 8B, 8C:
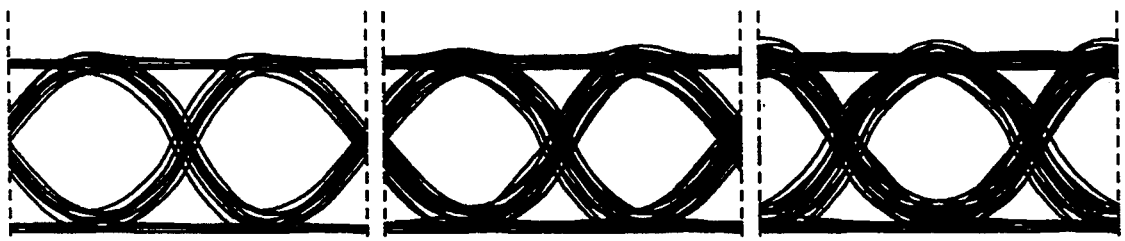
FIG. 8(a) shows computer simulation data obtained by applying the techniques of the present invention to 20 Gbit/s optical communication over a 10,000 km span.
FIG. 8(b) shows the effect of a high amplifier noise figure on the results of FIG. 8(a).
FIG. 8(c) shows the effect of combined high amplifier noise figure and dispersion fluctuations on the results of FIG. 8(a).

FIG. 8 shows simulation data obtained by applying the techniques of the present invention to 20 Gbit/s optical communication over a 10,000 km span. The other system parameters were the same as the case shown in FIG. 7. In FIG. 8(*a*) an eye diagram is shown for the case of noiseless amplifiers and perfectly homogeneous dispersion. Although the bit rate-distance product has been increased to 200 Tbit/s-km, an even more open eye is obtained. FIG. 8(b) shows the effect of adding an amplifier noise figure of 6 dB to the simulation on the results of FIG. 8(a). FIG. 8(c) shows the effect of combined 6 dB amplifier noise figure and 5% dispersion fluctuations on the results of FIG. 8(a). Although some reduction in phase margin is apparent, these results indicate that the improvements of the present invention are relatively insensitive to amplifier noise, amplifier degradation, and fluctuation in fiber dispersion.

It should again be emphasized that the foregoing embodiments are exemplary only. To compensate for second order dispersion and fiber nonlinearities in accordance with the present invention, many different variations may be made in the number and spacing of in-line amplifiers, the amplifier output power, the fiber span power distribution, the relative lengths and dispersion functions of the first and second portions of various segments of the fiber span, the number of segments and optical phase conjugators in each span, as well as in other system parameters. Furthermore, the compensation techniques of the present invention may be utilized to improve performance in many different systems having a wide range of data rates and transmission distances. These and other alternatives and variations in the arrangements shown will be readily apparent to those skilled in the art.

We claim:

1. A method of optical signal transmission comprising the steps of:
   providing an optical fiber span and made up of at least one segment, each of said segments having a first portion and a second portion;
   providing an optical signal transmitter at one end of said optical fiber span for supplying an optical signal to said optical fiber span;
   providing an optical signal receiver at an opposite end cf said optical fiber span for receiving said optical signal from said optical fiber span;
   providing at least one in-line amplifier within each of said first and said second portions of said segment of said optical fiber span;
   phase conjugating said optical signal in an optical phase conjugator provided between said first and said second portions of said segment; and
   adjusting a power level of said optical signal in at least one of said portions of at least one of said segments of said fiber span to compensate for a nonlinearity of said fiber span.

2. The method of claim 1 wherein said step of adjusting a power level of said optical signal includes adjusting a position of said in-line amplifier within at least one of said portions of at least one of said segments of said span.

3. The method of claim 1 wherein said step of adjusting a power level of said optical signal includes adjusting an output power of said in-line amplifier within at least one of said portions of at least one of said segments of said span.

4. The method of claim 1 wherein said step of providing an optical fiber span further includes providing said first portion of at least one of said segments with a second order dispersion opposite in sign to a second order dispersion of said second portion of said segment.

5. The method of claim 1 further including the step of adjusting a dispersion-length product in at least one of said first and said second portions of said segment such that said dispersion-length product of said first portion is substantially equivalent to a dispersion-length product of said second portion in order to compensate for a second order dispersion within said fiber span.

6. The method of claim 5 wherein said step of adjusting a dispersion-length product of said first or said second portion includes adjusting a length of at least one of said first and said second portions of said segment.

7. The method of claim 5 wherein said step of adjusting a dispersion-length product of said first or said second portion includes adjusting a first order dispersion value of at least one of said first and said second portions of said segment.

8. The method of claim 6 wherein said step of adjusting a length of at least one of said first and said second portions of said segment includes increasing said length by adding an additional length of fiber to said second portion of said segment after a final in-line amplifier within said portion of said segment.

9. The method of claim 6 wherein said step of adjusting a length of at least one of said first and said second portions of said segment includes increasing said length by adding substantially equivalent additional lengths of fiber between each of said in-line amplifiers within said portion of said segment.

10. The method of claim 1 wherein said step of providing an optical signal transmitter for supplying an optical signal to said optical fiber span includes providing a transmitter for supplying a multi-channel optical signal having a plurality of channel signals, each of said channel signals having a distinct carrier frequency, and further wherein said step of providing an optical phase conjugator includes providing a multi-channel phase conjugator.

11. The method of claim 10 wherein said step of phase conjugating said optical signal further includes the steps of:
    passing said multi-channel optical signal through an input channel router such that said optical channel signals are separated from each other;
    separately phase conjugating each of said optical channel signals to produce phase conjugated optical channel signals; and
    combining said phase conjugated optical channel signals by passing said signals through an output channel router such that said phase conjugated optical channel signals form a multi-channel optical signal.

12. The method of claim 10 wherein said step of phase conjugating said multi-channel optical signal shifts said carrier frequencies of each of said optical channel signals such that a given channel signal has a carrier frequency after phase conjugation equivalent to a carrier frequency of an adjacent channel signal before phase conjugation.

13. An optical communication system comprising:
    an optical fiber span made up of at least one segment, each of said segments having a first portion and a second portion;
    an optical signal transmitter at one end of said optical fiber span for supplying an optical signal to said optical fiber span;
    an optical signal receiver at an opposite end of said optical fiber span for receiving said optical signal from said optical fiber span;
    at least one in-line amplifier within each of said first and said second portions of said segment of said optical fiber span to provide a power level for said optical signal within said portions such that a non-linearity of said fiber span is compensated within said portions; and an optical phase conjugator between said first and said second portions of said segment for phase conjugating said optical signal.

14. The communication system of claim 13 further including a plurality of said in-line amplifiers spaced less than about 40 km apart.

15. The communication system of claim 13 wherein at least one of said portions includes a plurality of in-line amplifiers evenly spaced apart such that said span has an approximately lossless power distribution.

16. The communication system of claim 13 wherein said first portion of said segment has a dispersion-length product substantially equivalent to a dispersion-length product of said second portion of said segment to compensate for a second order dispersion within said optical fiber span.

17. The communication system of claim 13 wherein a length of said second portion of said segment includes an additional length of fiber added to said second portion of said segment after a final in-line amplifier within said second portion of said segment.

18. The communication system of claim 13 wherein said optical fiber span is made up of a single optical fiber segment, with an optical phase conjugator between said first and second portions of said single segment.

19. The communication system of claim 13 wherein said optical fiber span is made up of two segments of approximately equal length, with an optical phase conjugator located between said first and second portions of each of said segments.

20. The communication system of claim 13 wherein said optical signal is a multi-channel optical signal having a plurality of channel signals, and wherein said phase conjugator is a multi-channel phase conjugator including:

an input channel router for separating said multi-channel optical signal into said optical channel signals;

a plurality of single channel phase conjugators for phase conjugating each of said optical channel signals to produce separately phase conjugated optical channel signals; and an output channel router for combining said phase conjugated optical channel signals such that said phase conjugated optical channel signals form a phase conjugated multi-channel optical signal.

* * * * *